US006859503B2

United States Patent
Pautler et al.

(10) Patent No.: US 6,859,503 B2
(45) Date of Patent: Feb. 22, 2005

(54) METHOD AND SYSTEM IN A TRANSCEIVER FOR CONTROLLING A MULTIPLE-INPUT, MULTIPLE-OUTPUT COMMUNICATIONS CHANNEL

(75) Inventors: Joseph J. Pautler, Fort Worth, TX (US); Kamyar Rohani, Keller, TX (US); Robert M. Harrison, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 351 days.

(21) Appl. No.: 10/113,699

(22) Filed: Apr. 1, 2002

(65) Prior Publication Data

US 2003/0185309 A1 Oct. 2, 2003

Related U.S. Application Data

(60) Provisional application No. 60/281,985, filed on Apr. 7, 2001.

(51) Int. Cl.[7] ............................................. H04L 27/20
(52) U.S. Cl. ..................................................... 375/299
(58) Field of Search ................................. 375/299, 267, 375/346, 347; 455/69, 522, 103

(56) References Cited

U.S. PATENT DOCUMENTS 5,999,826 A    12/1999    Whinnett

FOREIGN PATENT DOCUMENTS

| EP | 1 073 212 A | | 1/2001 |
|---|---|---|---|
| GB | 2 353 437 | * | 2/2001 |
| WO | WO 00 36764 A | | 6/2000 |

OTHER PUBLICATIONS

Raleigh, G.G., and J.M. Cioffi,"Spatio–Temporal Coding for Wireless Communications" Information Systems Lab, Stanford University, CA; IEEE 1996, pp 1809–1814.

Foschini, Gerard J. "Layered Space–Time Architecture for Wireless Communication in a Fading Environment When Using Multi–Element Antennas" Bell Labs Technical Journal, 1996, pp 41–59.

* cited by examiner

*Primary Examiner*—Chieh M. Fan
*Assistant Examiner*—Kevin Kim (57) ABSTRACT

The present invention makes it possible to increase a data rate between a transmitter and receiver using a multiple-input, multiple-output radio frequency channel. A multiple-stream, multiple-antenna receiver measures a composite channel between a multiple-antenna transmitter and a multiple-antenna receiver to produce a composite channel measurement. The receiver selects a plurality of antenna array weight sets for use in the multiple-antenna transmitter in response to the composite channel measurement, where each antenna array weight set is associated with one of multiple data streams. Information describing the plurality of antenna array weight sets for use in the multiple-antenna transmitter are then transmitted.

14 Claims, 8 Drawing Sheets

METHOD AND SYSTEM IN A TRANSCEIVER FOR CONTROLLING A MULTIPLE-INPUT, MULTIPLE-OUTPUT COMMUNICATIONS CHANNEL

REFERENCE(S) TO RELATED APPLICATION(S)

The present application claims priority from provisional application, Ser. No. 60/281,985, entitled "METHOD AND SYSTEM IN A TRANSCEIVER FOR CONTROLLING A MULTIPLE-INPUT, MULTIPLE-OUTPUT COMMUNICATIONS CHANNEL," filed Apr. 7, 2001, which is commonly owned and incorporated herein by reference in its entirety.

FIELD OF THE INVENTION

The present invention is related in general to communication systems, and more particularly to a method and system for controlling the transmitting and receiving of multiple data streams in a multiple-input, multiple-output communications channel.

BACKGROUND OF THE INVENTION

Communication system designers are always looking for ways to increase the capacity of a communications channel between a transmitter and receiver. A communications channel may be defined as a system that transmits a sequence of symbols from one point to another. For example, a cellular communications system includes a channel for wirelessly transmitting a sequence of symbols that represent voice or data, back and forth between the telephone system and subscriber unit. An increase in the capacity of this channel means an increase in the rate of transmitting symbols. And when more symbols are transmitted in the same amount of time, voice can sound better, and it may take less time to transfer data files.

To increase the capacity of a wireless communications channel, antenna arrays have been used at the transmitter to better focus the transmitted energy at the receiver. An antenna array is a group of spaced apart antennas that each transmit an antenna signal that has a specific gain and phase relationship with the other antenna signals. When the antennas work together transmitting the antenna signals, they produce an antenna pattern that is more focused on the receiver than a pattern produced by a single antenna. Note that the process of changing the gain and phase of a signal to produce antenna signals may be referred to as "weighting" the signal using a set of "antenna array weights."

Because antenna arrays may similarly be used at a receiver to improve signal quality, use of antenna arrays at both the transmitter and receiver has also been proposed to increase channel capacity. When multiple antennas are used at the transmitter and receiver, the wireless channel between them may be referred to as a multiple-input, multiple-output (MIMO) channel.

Figure 1:
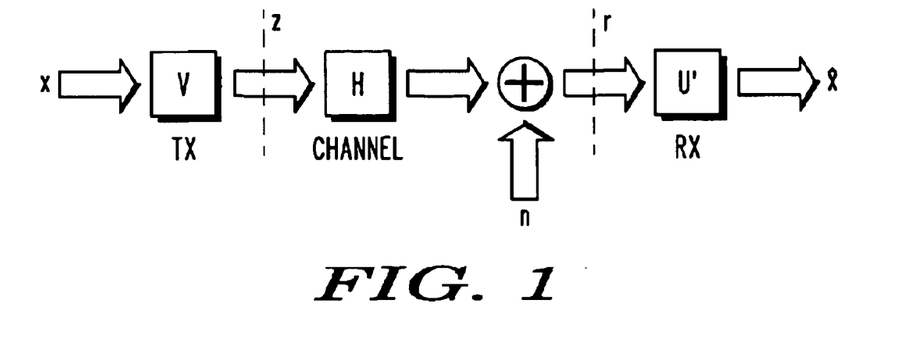
FIG. 1 is a high-level schematic diagram of a communications channel, wherein a portion of the communications channel is wireless.

FIG. 1 shows a high-level schematic diagram of a communications channel, wherein a portion of the communications channel is wireless. As shown, x represents user data that will be wirelessly transmitted to the receiver. At the receiver, x is represented as an estimate of the data, x̂. User data x may be split to produce a vector that represents multiple data streams, $x_1, x_2, \ldots$ User data x is processed by matrix V to produce adaptive array antenna signals z. Each column of matrix V is a vector containing an antenna array weight set used to transmit one of the data streams $x_i$. Signals z are transmitted from antenna elements of the antenna array, through the air, and received at the receiver antenna array as received antenna signals r. The air interface between antenna signals z and received antenna signals r includes matrix H, which describes the effects of the air interface on signals z. The air interface is also described by the addition of noise n to signals z.

Received antenna signals r are processed in the receiver by matrix U' to produce the estimate of data, x̂.

Figure 2:
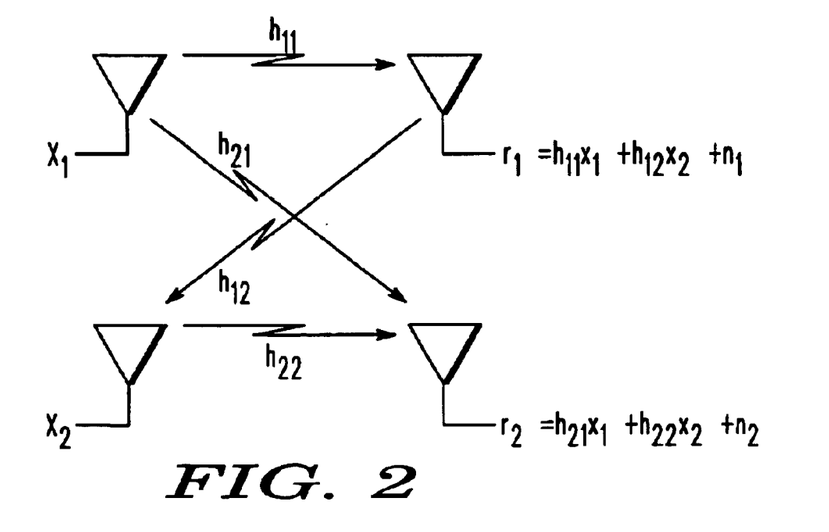
FIG. 2 is a high-level block diagram of a two-input, two-output MIMO channel.

With reference now to FIG. 2, there is depicted a two-input, two-output MIMO antenna array system. This MIMO system may be used to simultaneously transmit two different data streams, $x_1$ and $x_2$, to a single subscriber unit through a "composite channel" H, defined by the matrix $$H = \begin{bmatrix} h_{11} & h_{12} \\ h_{21} & h_{22} \end{bmatrix}$$

where $h_{ij}$, i=1,2, j=1,2 are complex channel values. Note that the term "composite channel" as used herein refers to a complete measurement or description of a channel, wherein the effects of all combinations of transmit antennas and receive antennas are considered. The composite channel may be thought of as the aggregation of all channels between pairs of single antennas, defined by all pair-wise combinations of transmit and receive antennas.

When a flat Rayleigh fading channel is assumed, $h_{ij}$ are complex-valued Gaussian numbers with unity average power, $E[h_{ij} h_{ij}^+]=1$. The received (baseband) vector r (see FIG. 1) can be written as follows:

$$r = Hx + n$$

where $x=[x_1 \ x_2]^T$ is the vector of transmitted data streams, and n is a vector of noise samples, with additive white Gaussian noise with variance $\sigma_n^2$.

Note that in a noise free channel, both streams can be recovered perfectly if channel matrix H is full rank. That is, two equations and two unknowns can be solved to recover the unknowns $x=[x_1 \ x_2]^T$. When $x=H^{-1}r$, both data streams can be recovered and link, or channel, capacity can be doubled. For example, a linear architecture may use zero forcing receivers to multiply the received vector r, with $H^{-1}$. This works well with a high signal-to-noise ratio (SNR), but with a low SNR it boosts noise, which is not desirable.

In another linear receiver architecture, a Minimum Mean Square Error (MMSE) receiver may be used to minimize the average difference between detected data streams and the received signal.

While linear and non-linear receiver architectures can both be implemented to detect the multiple streams in noisy channels, in practical applications, noise in the channel will often require the use of non-linear receivers, which are more complicated and expensive to build. Examples of non-linear receivers with improved performance are Serial-Interference-Cancellation (SIC) receivers and a Maximum Likelihood (ML) receivers. Because of their complexity and cost, non-linear receivers should be avoided if possible.

Theoretical MIMO Capacity:

The capacity of a MIMO system may be shown with the following analysis. Suppose the Singular Value Decomposition (SVD) of the channel matrix H is given by $$H = USV' \qquad (1)$$

where S is a diagonal matrix composed of the singular values (i.e., the square-roots of eigenvalues of H'H or HH'), U is an orthogonal matrix with column vectors equal to the eigenvectors of HH', V is an orthogonal matrix with columns equal to the eigenvectors of H'H, and the "'", operator is the complex conjugate transpose operation. As an example, consider the following composite channel matrix $$H = \begin{bmatrix} 1 & 1 \\ 1 & -1 \end{bmatrix} \tag{1.1}$$

The SVD of this composite channel is $$H = USV' = \begin{bmatrix} 1/\sqrt{2} & 1/\sqrt{2} \\ 1/\sqrt{2} & -1/\sqrt{2} \end{bmatrix} \begin{bmatrix} \sqrt{2} & 0 \\ 0 & \sqrt{2} \end{bmatrix} \begin{bmatrix} 1 & 0 \\ 0 & 1 \end{bmatrix} \tag{1.2}$$

Referring to FIG. 1, the transmit vector is $$z = Vx \tag{2}$$

Thus, the received vector is $$r = Hz + n \tag{3}$$

Replacing H and z with (1) and (2), we get $$r = USV'Vx + n = USx + n \tag{4}$$

where, since V is an orthonormal matrix, V'V is replaced with identity. Next, the received vector is pre-multiplied with U':

$$\hat{x} = U'USx + U'n \tag{5}$$
$$= Sx + e$$

Again, since U is an orthonormal matrix, U'U is replaced with identity. Note that the new noise vector, e, has the same covariance matrix as n, because pre-multiplication with an orthonormal matrix does not alter the noise covariance.

If equation (5) is rewritten for the case of 2 transmit antennas, and 2 receive antennas it becomes:

$$\begin{bmatrix} \hat{x}_1 \\ \hat{x}_2 \end{bmatrix} = \begin{bmatrix} \sqrt{\lambda_1} & 0 \\ 0 & \sqrt{\lambda_2} \end{bmatrix} \begin{bmatrix} x_1 \\ x_2 \end{bmatrix} + \begin{bmatrix} e_1 \\ e_2 \end{bmatrix} = \begin{bmatrix} \sqrt{\lambda_1} x_1 + e_1 \\ \sqrt{\lambda_2} x_2 + e_2 \end{bmatrix} \tag{6}$$

where $\lambda_i$ are the channel matrix eigenvalues.

The error free channel capacity based on the Shannon bound is well known, and is given by $$C_1 = \log_2(1 + \rho) \text{ bits/symbol} \tag{7}$$

where $\rho$ is the channel SNR. From (5) and (6), note that the MIMO channel capacity based on the Shannon bound is the sum of the capacities per data stream:

$$C_{MIMO} = \sum_{i=1}^{M} C_i = \sum_{i=1}^{M} \log_2\left(1 + \frac{\rho}{M}\lambda_i\right) \text{ bits/symbol} \tag{8}$$

where M is the minimum number of antennas at either the transmitter or the receiver. For the 2 transmit antenna, 2 receive antenna example, M=2. It is important to note that in (8), the total transmit power has been normalized such that it remains the same for any number of transmit antennas. The ratio $\rho/M$ ensures equal power transmitted on all antennas, and it maintains the same total power for all values of M.

In general, equal power transmission of (8) is sub-optimal. The total capacity, which is the sum of each data stream capacity, $$C_{MIMO} = \sum_i C_i,$$

can be maximized by increasing the power to the high SNR streams, and reducing the power to the low SNR streams, such that the total transmit power remains the same. This procedure is typically referred to as "waterfilling."

By including waterfilling weights for optimum power allocation per data stream, (8) becomes:

$$C_{MIMO} = \sum_{i=1}^{M} \log_2\left(1 + \frac{\rho}{M}\lambda_i w_i\right) \text{ bits/symbol} \tag{9}$$

where waterfilling weights are computed from $$\sum_i w_i = \sum_i \max\left[0, \left(K - \frac{\sigma_n^2}{\lambda_i}\right)\right] = 1,$$

which is the waterfilling criterion, which is discussed by R. G. Gallager in *Information Theory and Reliable Communication*, New York: John Wiley & Sons, 1968. Here, K is a constant determined by iterations, and $w_i$ are set accordingly.

Because transmitters in prior art systems lack data regarding the conditions of the composite channel, the performance of these systems cannot approach the Shannon bound for the MIMO channel. Furthermore, the amount of data needed to describe a composite MIMO channel is large, which would consume a large percentage of channel capacity when communicated to the transmitter.

Thus, it should be apparent that a need exists for an improved method and system for using feedback to efficiently control data transmission and reception in a multiple-input, multiple-output radio frequency channel.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 3:
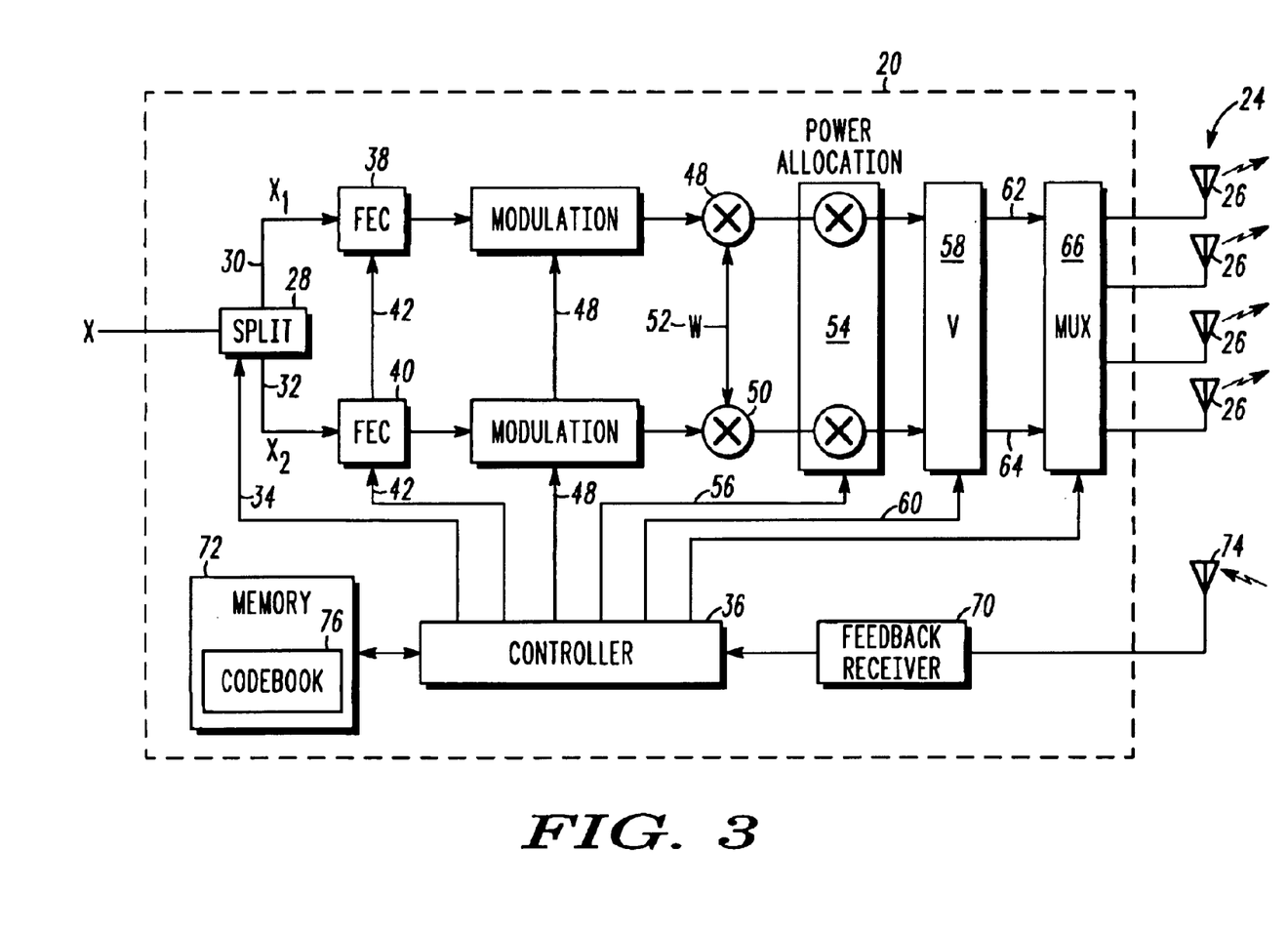
FIG. 3 is a block diagram of a multiple-stream, multiple-antenna transmitter that may be used to implement the method and system of the present invention.

With reference now to FIG. 3, there is depicted a multiple-stream, multiple-antenna transmitter that may be used to implement the method and system of the present invention. As illustrated, transmitter 20 receives user data 22 and transmits user data 22 using antenna array 24, which comprises antenna elements 26.

User data 22 enters data splitter 28, which separates the user data stream into a plurality of data streams, such as data stream 30 and data stream 32. While two data streams are shown in FIG. 3, data splitter 28 may produce any number of data streams. Data splitter 28 splits data in proportion to control signal 34, which is produced by controller 36. For example, control signal 34 may specify a ratio of 2-to-1, wherein two bits are sent to data stream 30 and one bit is sent to data stream 32. This splitting ratio may specify an equal number of bits on both streams, or all data bits are sent to one stream.

Data streams 30 and 32 output by data splitter 28 are input into error correction encoders 38 and 40. These error correction encoders may be implemented with a convolutional encoder, a turbo encoder, a block encoder, or the like. The type of encoding, and the rate of encoding is controlled by control signal 42, which is output by controller 36. Note that control signal 42 may set error correction encoders 38 and 40 to the same error encoding schemes, or different encoding schemes.

Outputs of error correction encoders 38 and 40 are coupled to inputs of modulators 44 and 46. Modulators 44 and 46 may be implemented with linear or non-linear modulation schemes, including all varieties of modulators that modulate amplitude and phase, and combinations of amplitude and phase. Examples of modulators that may be used include Binary Phase Shift Keying modulators (BPSK), Quadrature Phase Shift Keying modulators (QPSK), M-ary phase shift keying modulators, M-ary quadrature amplitude modulators (MQAM), and the like.

Control signal 48 selects the type of modulation used in modulators 44 and 46. Control signal 48 is produced by controller 36. According to the present invention, the modulation schemes in the data streams may be the same, or different.

The output of modulators 44 and 46 are coupled to inputs of spreaders 48 and 50, respectively. Spreaders 48 and 50 spread the signal using spreading code 52, wherein the spreading code is assigned to user data 22.

Outputs of spreaders 48 and 50 are coupled to inputs of power allocator 54. Power allocator 54 sets a power ratio between data streams 30 and 32 in response to control signal 56 from controller 36. Power allocator 54 may allocate all power to one data stream, equal powers on data streams, or other ratios of unequal power allocations. Power allocator 54 does not allocate power to data streams 30 and 32 relative to data streams belonging to other user data not shown in FIG. 3. This means that power allocator 54 does not allocate an absolute level of power to a user. The absolute power allocated to each data stream, and each user, is determined by available power in power amplifiers and other control functions not shown in FIG. 3.

Outputs of power allocator 54 are coupled to inputs of antenna array signal processor 58, which further processes the data streams by applying antenna array weight sets to each data stream. These antenna array weight sets come from controller 36 via control signal 60. By applying the antenna array weight sets to data streams 30 and 32, antenna array signal processor enables the transmission of each data stream with a different antenna array pattern.

The outputs of antenna array signal processor 58 include weighted components of the input data streams. For example, output 62 may include a phase-and-gain weighted portion of data stream 30 added together with a phase-and-gain weighted portion of data stream 32. The number of weighted outputs from antenna array signal processor 58 may be equal to or greater than the number of data streams. While the number of outputs of antenna array signal processor 58 may be greater than the number of data streams input, the number of data streams transmitted remains the same.

Figure 4:
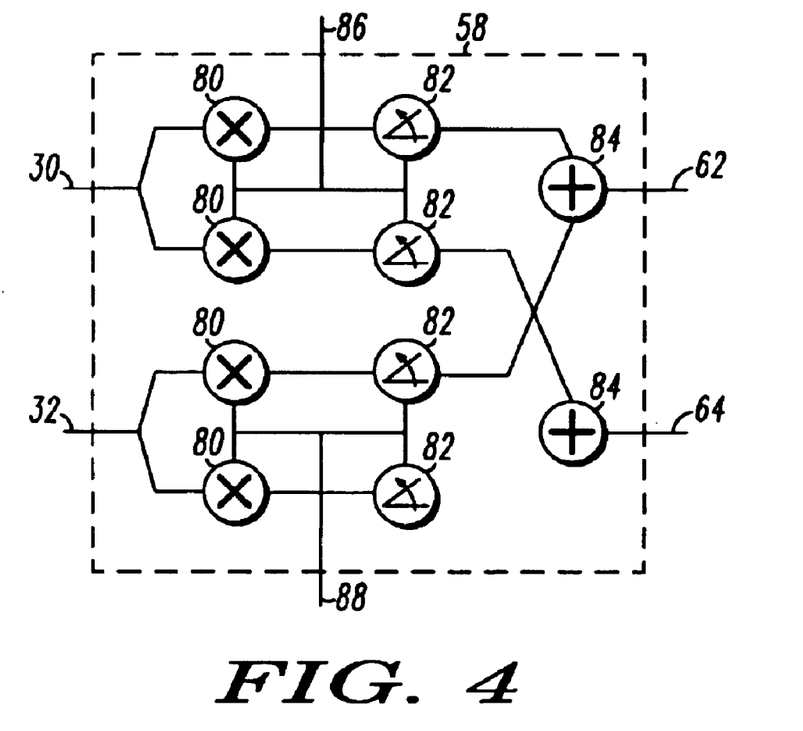
FIG. 4 is a more detailed block diagram of antenna array signal processor.

With reference now to FIG. 4, there is depicted a high-level block diagram of antenna array signal processor 58. As shown, data streams 30 and 32 enter antenna array signal processor 58, wherein a copy of each data stream is sent to a gain multiplier corresponding to an antenna element that will be used in an antenna array. In the example shown in FIG. 4, two antennas will be used in the antenna array, therefore copies of each data stream are sent to two gain multipliers 80.

Following each gain multiplier 80 is a phase shifter 82, which rotates the phase of the signal according to a control signal input. Outputs of phase shifters 82 are coupled to summers 84, which add the weighted data streams to produce output signals 62 and 64.

Control signal 60 (see FIG. 3) includes a plurality of antenna array weight sets, wherein one antenna array weight set is associated with each data stream. For example, control signal 60 includes weight set signals 86 and 88. Weight set signal 86 includes gain and phase weights (i.e., complex weights) for each gain multiplier 80 and phase shifter 82 associated with data stream 30. Thus, the outputs of phase shifters 82 associated with data stream 30 produce antenna signals that provide a selected antenna pattern for data stream 30. Similarly, weight set signal 88 includes phase and gain weights for each gain multiplier 80 and phase shifter 82 associated with data stream 32. In the outputs of phase shifters 82 associated with data stream 32 produce antenna signals for driving an antenna array with a selected pattern for data stream 32.

In order to produce desired antenna patterns for each data stream, gain multipliers 80 associated with a data stream may have different gain values and phase shifters 82 associated with a data stream may have different phase shift values, whereby producing antenna signals that work together to form a particular transmission pattern.

In some embodiments of transmitter 20, output signals 62 and 64 may be up-converted, amplified, and coupled to two antenna elements 26. However, in the embodiment shown in FIG. 3, multiplexer 66 is used to couple output signals 62 and 64 to selected antenna elements 26 in response to control signal 68 from controller 36. This means that control signal 62 may be coupled to any one of antenna elements 26 in antenna array 24, while output signal 64 is coupled to one of the remaining antenna elements 26.

Controller 36 outputs control signals 34, 42, 48, 56, 60, and 68 based upon information received from feedback receiver 70, and data stored in memory 72. Feedback receiver 70 is shown coupled to antenna 74 for receiving feedback data from a remote receiver, such as the receiver shown in FIG. 5. While antenna 74 is shown separate from antenna array 24, one of the antenna elements 26 of array 24 may be used to receive the feedback data.

Feedback data from feedback receiver 70 may include a codebook index, which may be used by controller 36 to lookup transmission parameters in codebook 76 within memory 72.

Controller 36 may also be used to calculate, or derive, additional control signals or transmission parameters based upon feedback data. Therefore, it should be understood that feedback data may include measurements upon which calculations may be based, or data that indicates parameters to be used in transmitter 20.

Figure 5:
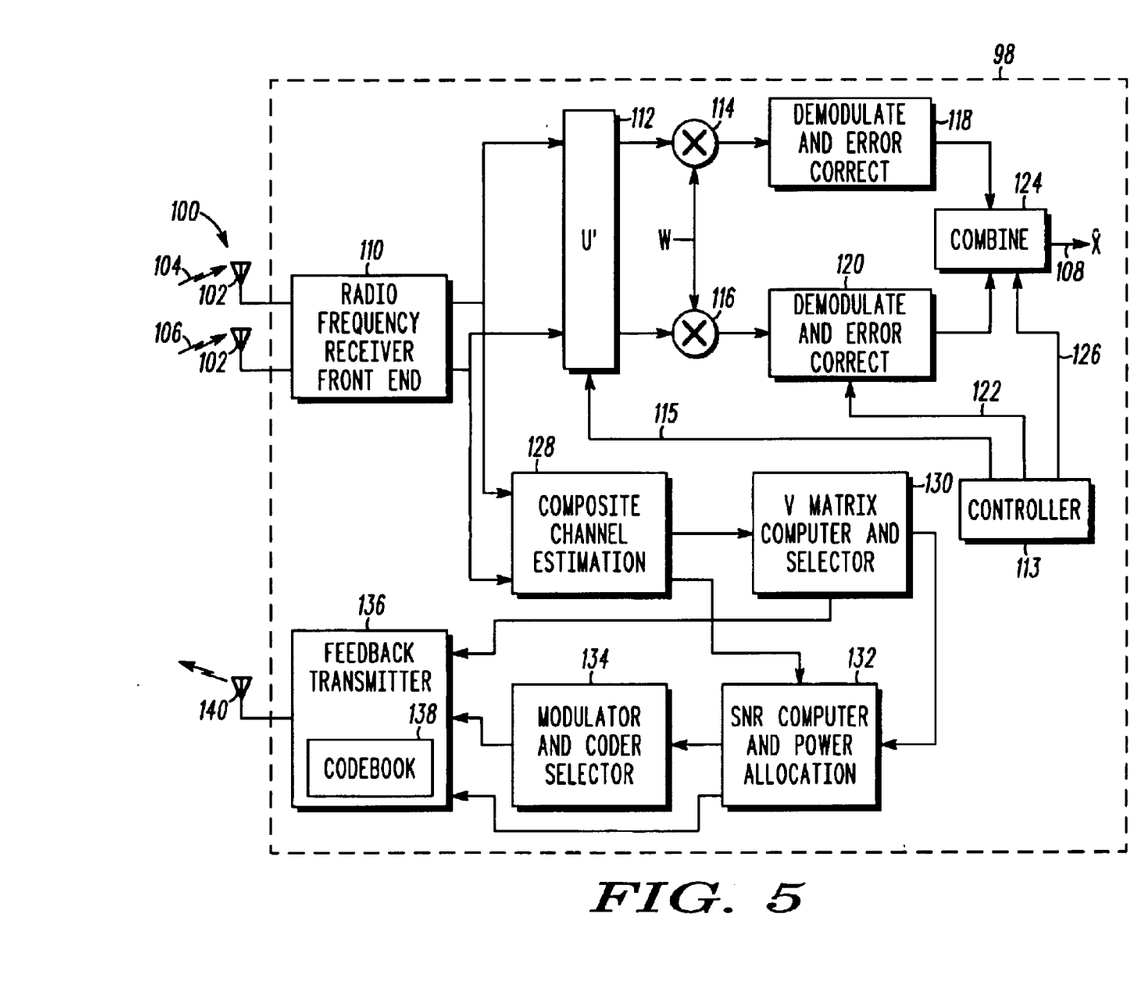
FIG. 5 depicts a receiver for use in a multiple-stream, multiple-antenna transceiver system in accordance with the method and system of the present invention.

With reference now to FIG. 5, there is depicted a receiver for use in a multiple-stream, multiple-antenna transceiver system in accordance with the method and system of the present invention. As shown, receiver 98 includes antenna array 100 having elements 102 that receive radio frequency signals 104 and 106. Received RF signals 104 and 106 are most likely different signals because antenna elements 102 are spaced apart, and propagation paths taken by received RF signals 104 and 106 from antenna elements 26 of transmitter 20 are most likely different in a multi-path fading environment.

In the multiple-stream, multiple-antenna transceiver system that is made up of transmitter 20 and receiver 98, multiple data streams are transmitted to increase the data throughput between transmitter 20 and receiver 98. Transmitter 20 is able to simultaneously transmit multiple data streams, and receiver 98 is able to keep the multiple streams separate by exploiting the differences in the channel characteristics between the multiple antennas at transmitter 20 and receiver 98. Thus, user data 22 in transmitter 20 is received by receiver 98 and output as estimated user data 108.

Received RF signals 104 and 106 are input into radio frequency receiver front end 110, wherein the radio frequency signals are down converted and digitized. The output of radio frequency receiver front end 110 is a stream of complex baseband digital samples that represent received RF signals 104 and 106.

The outputs of radio frequency receiver front end 110 are input into receiver signal processor 112, which has the function of separating data streams 30 and 32 (See FIG. 3) in receiver 98. In one embodiment of the present invention, receiver signal processor 112 may be implemented by multiplying the input signals by the complex conjugate transpose of the U matrix, which is the left singular vectors of the singular value decomposition of the composite channel matrix H. Receiver signal processor 112 is controlled by control signal 115 from controller 113.

The data streams output by receiver signal processor 112 are input to despreaders 114 and 116, which despread the signals using spreading code 52, which is the same spreading code used in the transmitter. The outputs of despreader 114 and 116 are coupled, respectively, to the inputs of demodulator and decoders 118 and 120. Each demodulator and decoder 118 and 120 demodulates the signal and decodes the signal using demodulation and error correction decoding techniques that compliment those selected for each data stream in the transmitter. Thus, the type of demodulator and decoder functions used depends upon what was used in transmitter 20, as indicated by control signal 122 from controller 113. Demodulators and decoders 118 and 120 may be the same function, or may be different functions.

The outputs from demodulator and decoder 118 and 120 are input into combiner 124, which combines the multiple streams received back into a single stream for output as estimated user data 108. Combiner 124 operates under the control of controller 113, as directed by control signal 126. Because the received data streams may have different data rates, and because one data stream may have a data rate equal to zero, combiner 124 must reconstruct the user data in accordance with the way data was originally split by data splitter 28 in transmitter 20 in FIG. 3.

In order to control the transmission of multiple data streams via multiple antennas at the transmitter, receiver 98 must measure the composite channel and send feedback data to the transmitter. As shown, outputs of radio frequency front end 110 are also coupled to composite channel estimator 128, which uses pilot signals transmitted from each antenna element 26 in transmitter 20 to measure the composite channel between the multiple input antennas and multiple output antennas. The function of composite channel estimator 128, and many of the other functional blocks in the data feedback portion of receiver 98, are described in more completely in reference to FIG. 8, below.

The output of composite channel estimator 128, which is represented by the H matrix, is input into V matrix computer and selector 130. The "computing function" of block 130 computes V, which is a matrix describing desired antenna array weight sets to be used for each data stream in transmitter 20. The desired antenna array weight sets are computed based upon the composite channel measurement.

The "selector function" of block 130 is a quantizing function that selects antenna array weight sets that most closely match the desire antenna array weight sets. By performing quantization, the amount of feedback data required to instruct transmitter 20 how to transmit over the MIMO channel may be reduced.

The selected antenna array weight sets output by computer and selector 130 are input into SNR computer and power allocator 132, wherein a signal to noise ratio is computed for each data stream hypothetically transmitted using the selected antenna array weight sets. Based upon the SNR computations, the power allocation function of block 132 allocates power to each data stream, wherein the power is allocated to maximize the data throughput based upon a waterfilling algorithm. Once power has been allocated to each data stream, final SNR calculations may be performed using the selected power allocation.

Modulator and coder 134 receives information from SNR computer and power allocator 132 that it uses to select an encoding scheme and a modulation scheme to be used in transmitter 20. Generally, higher order modulators are selected for data streams having high signal-to-noise ratios.

Feedback transmitter 136 receives information from the V matrix computer and selector 130, SNR computer and power allocator 132, and modulator and coder selector 134. This data represents calculations and selections made in receiver 98 that will be used to control the transmission modes of transmitter 20. In a preferred embodiment, feedback transmitter 136 analyzes the data and selects a codebook value associated transmitter parameters that most closely match the transmitter parameters represented by the input data. Therefore, feedback transmitter 136 may include codebook 138 for producing a codebook value that is transmitted to transmitter 20 via antenna 140. Although antenna 140 is shown separate from receive antenna array 100, antenna 140 may be one of the antenna elements 102 in receive antenna array 100. Data transmitted by feedback transmitter 136 is received in transmitter 20 by feedback receiver 70.

Figure 6:
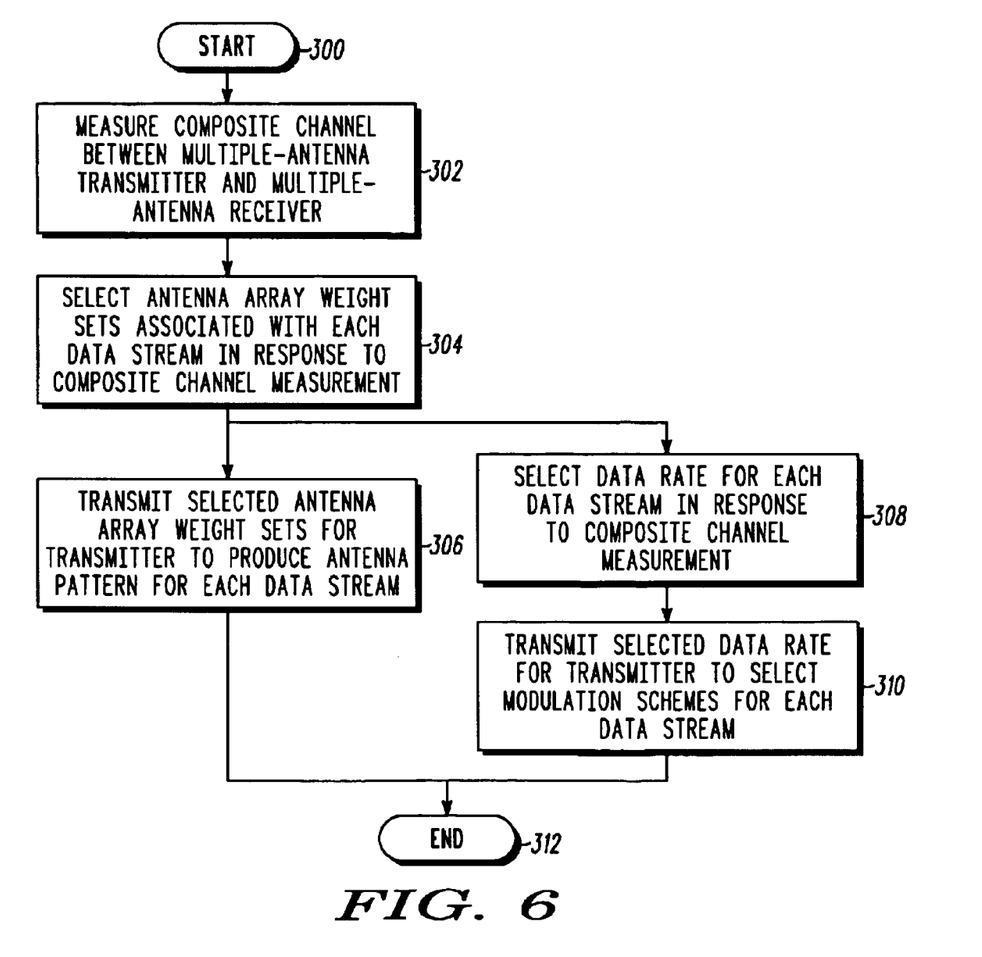
FIG. 6 is a high-level logic flowchart that illustrates a feedback method in a multiple-stream, multiple-antenna receiver in accordance with the method and system of the present invention.

With reference now to FIG. 6, there is depicted a high-level logic flowchart that illustrates a feedback method in a multiple-stream, multiple-antenna receiver in accordance with the method and system of the present invention. As illustrated, the process begins at block 300, and thereafter passes to block 302 wherein the composite channel between the multiple-antenna transmitter and the multiple-antenna receiver is measured. This measurement results in the formation of the H matrix that is made up of complex channel values, representing gains and phases, as discussed above in reference to FIG. 2. The composite channel measurement is made by analyzing received antenna signals r (See FIG. 1) that include received pilot signals transmitted by each antenna at the transmitter.

Next, the process selects an antenna array weight set associated with each data stream in response to the composite channel measurement, as depicted at block 304. Note that each simultaneously transmitted data stream has an associated set of weights that are used for each array antenna at the transmitter. Each antenna array weight set is used to produce an antenna pattern for the associated data stream.

In a preferred embodiment, selected antenna array weight sets are determined by calculating the right singular vectors of the SVD of composite channel matrix H. This process is more completely described with reference to FIG. 8. To reduce the amount of data needed to represent the antenna array weight sets, the desired weight sets are compared to weight sets in a codebook, and one or more codebook weight sets having the closest distance are selected. The codebook indicator may represent a single antenna array weight set, or a combination of antenna array weight sets.

Note that if predefined combinations of antenna array weight sets are used, a first amount of information may be transmitted to describe a first antenna array weight set, and a second amount of information may be transmitted to describe a second antenna array weight set, wherein the second amount of information may be less than the first amount of information. Similarly, if a second antenna array weight set is restricted, or constrained, to a have a predefined relationship to a first antenna array weight set, the amount of information needed to describe the second set is less than that needed to describe the first.

Once selected, the antenna array weight sets are transmitted to the transmitter, and the transmitter uses the weights to produce selected antenna patterns for each data stream, as illustrated at block 306. Because of the volume of data that may be needed to represent a complex weight for each antenna, for each data stream, it may be advantageous to use techniques that reduce the number of data bits transmitted from the receiver to the transmitter. As mentioned above, a codebook may be used to store several predefined antenna array weight sets. The number of antenna array weight sets available will determine the resolution of the quantizing process that takes an ideal set of weight sets and maps it to one of the available antenna array weight sets. Note that quantizing errors may become excessive if the number of available antenna array weight sets is too small.

As mentioned above, another way to reduce the amount of feedback data is to constrain the transmitter to transmitting antenna patterns that have selected relationships with one another. For example, in a preferred embodiment, the antenna patterns at the transmitter may be constrained to be orthogonal to one another. Thus, by specifying a first antenna pattern, any remaining patterns at the base may be calculated, at least partially, according to the constraint relationships. Therefore, in a transmitter that transmits two data streams, if a first antenna pattern is specified, the antenna pattern for the second data stream may be derived, or calculated, so that the second pattern is constrained to be orthogonal to (or have low correlation with) the first.

Details on V Quantization

The simplest method of quantizing a matrix is to quantize each element of the matrix individually. Unfortunately, this method is inefficient and will require the greatest number of feedback bits for a desired performance. V may be quantized with two basic approaches: "block" and "incremental" quantization. In the first approach, all columns of V are quantized at once. In the second approach, columns of V are quantized incrementally.

Block V Quantization

Because the V matrix is orthonormal, it has some structure that can be exploited to reduce the amount of feedback. For the 2-antenna transmitter and 2-antenna receiver case, the V matrix can be written as $$V = \begin{bmatrix} v_{11} & v_{12} \\ v_{21} & v_{22} \end{bmatrix} = \begin{bmatrix} \cos\alpha & \sin\alpha \\ e^{j\theta}\cdot\sin\alpha & -e^{j\theta}\cdot\cos\alpha \end{bmatrix},$$

where $\alpha = \cos^{-1}(v_{11})$, $\theta = \angle v_{21}$.

The entire V matrix can be represented by two real parameters. Using this representation, there is a sign ambiguity in the second column vector that must be handled at the receiver. Fortunately, the transmission remains orthogonal and an MMSE receiver handles the sign ambiguity automatically. The parameters $$\alpha \in \left[0, \frac{\pi}{2}\right] \text{and } \theta \in [0, 2\pi]$$

are uniformly quantized to a desired level. FIG. 5 shows that quantizing V with 5 bits (3 for $\theta$, 2 for $\alpha$) and using an MMSE receiver is within 0.4 dB of the unquantized case.

In general, a codebook of V matrices can be created and indexed. A technique such as vector quantization can be used to generate the codebook and also to create an efficient mapping between V and the codebook. Parametric quantization as used in the 2×2 case can also be extended to larger V matrices.

Incremental V Quantization

In this approach, the columns of V are repeatedly drawn from a codebook of antenna array weights. (For example, one may use the TX AA codebooks from the 3GPP standard, release 99, or extensions of these codebooks.) The correlation properties of the columns of V are mirrored by selecting successive antenna array weight sets from increasingly smaller subsets of the codebook. As will be shown below, this constrained search reduces the amount of feedback data.

The column of V corresponding to the highest quality stream is selected first. This column is selected as the antenna array weight set that produces the maximum power at the receiver. The entire codebook is searched for this weight set.

Next, a second column of V is selected. A subset of the antenna array codebook may be found by searching for a codebook entries that have a correlation below a desired correlation threshold. The correlation threshold may be set to zero to select an orthogonal subset. Then, the antenna array weight set that produces maximum power at the receiver is selected from the low correlation subset of the codebook.

If there are three data streams, the third column of V is selected from a subset of the subset of codebook entries that was searched for the second column of V. The subset contains antenna array weight sets with low correlation against the subset searched for the second column. This process continues for all streams.

Since successive columns of V are searched from successively smaller subsets of the antenna array codebook, successive columns of V can be represented with fewer feedback bits. In a 4-element antenna array codebook with 64 entries, the antenna array weight set for the first column of V can be represented with log2(64)=6 bits. By selecting an appropriate correlation threshold, the second column of V's weight set can be represented with 4 bits, a third column with 2 bits, and the fourth column with 0 bits (only 1 antenna array weight set is possible, given the correlation threshold constraint and the choice of the other 3 antenna array weight sets.) Therefore, the entire V matrix can be quantized with 12 bits.

The size of codebook subsets may not be integer powers of two (since their size is determined by the correlation threshold), which means that the successively computed weight sets are not efficiently quantized using an integer number of bits to separately represent each weight set. In this case, alternate embodiments may jointly code the weight sets using vector quantization, or use variable length code words to reduce the number of bits required to represent the entire V matrix. Note that these alternate embodiments still draw the antenna array weight sets from subsets of a single codebook of antenna array weight sets, with the difference being the source coding used to reduce the number of bits required to represent the V matrix.

In addition to feeding back selected antenna array weight sets, the receiver may also feedback data that allows the transmitter to select a forward error correction coding scheme, a modulation scheme, a power allocation for each data stream, and a selection of antennas in the transmit antenna array.

As shown in block 308, the process may select a data rate for each data stream in response to the composite channel measurement, the selected antenna array weight set, and SNR for each data stream. In a preferred embodiment, the SNR for each data stream is used to lookup a combination of encoding and modulation techniques according to calculated performance curves, and assuming equal power is available for both data stream. This lookup will provide an aggregated data throughput. This throughput value is compared to a second lookup assuming that all the power is used in the data stream having the highest signal to noise ratio. The second lookup gives a second data throughput, and the encoding and modulation scheme at the particular power setting is selected based upon the maximum throughput.

In a preferred embodiment, the codebook shown in table 1 below may be used in a system that sends four bits of feedback from the receiver to the transmitter in order to specify modulation and error encoding schemes for each data stream, and power allocation for each data stream. Note that antenna array weight sets are not included in the codebook of table 1.

TABLE 1

| Configuration # | Modulator #1 | Code #1 | Modulator #2 | Code #2 | Power 1 | Power 2 |
|---|---|---|---|---|---|---|
| 1 | QPSK | R=1/2 | — | R=1/2 | 1 | 0 |
| 2 | QSPK | R=1/2 | QPSK | R=112 | 0.5 | 0.5 |
| 3 | 16 QAM | R=1/2 | — | R=1/2 | 1 | 0 |
| 4 | 16 QAM | R=112 | QPSK | R=1/2 | 0.5 | 0.5 |
| 5 | 16 QAM | R=1/2 | 16 QAM | R=1/2 | 0.5 | 0.5 |
| 6 | 64 QAM | R=1/2 | — | R=1/2 | 1 | 0 |
| 7 | 64 QAM | R=1/2 | QPSK | R=1/2 | 0.5 | 0.5 |
| 8 | 64 QAM | R=1/2 | 16 QAM | R=1/2 | 0.5 | 0.5 |
| 9 | 64 QAM | R=1/2 | 64 QAM | R=1/2 | 0.5 | 0.5 |
| 10 | 256 QAM | R=1/2 | — | R=1/2 | 1 | 0 |
| 11 | 256 QAM | R=1/2 | QPSK | R=1/2 | 0.5 | 0.5 |
| 12 | 256 QAM | R=1/2 | 16 QAM | R=1/2 | 0.5 | 0.5 |
| 13 | 256 QAM | R=1/2 | 64 QAM | R=1/2 | 0.5 | 0.5 |
| 14 | 256 QAM | R=1/2 | 256 QAM | R=1/2 | 0.5 | 0.5 |

After the data rate is selected, the process transmits the selected data rate to the transmitter so the transmitter can select data encoding and modulation schemes for each data stream, as illustrated at block 310. In a preferred embodiment of the invention, the receiver computes data rates, encoding schemes, modulation schemes, and power levels for each data stream, and transmits data that indicates these selections to the transmitter. In an alternative embodiment, the receiver may transmit measurements, or data based upon measurements, to the transmitter so that the transmitter may select a data rate, an encoding scheme, a modulation scheme, and a power allocation for each data stream.

Once the feedback data is transmitted from the receiver to the transmitter, the process ends, as depicted at block 312. Although an end to the receiver feedback process is shown at block 312, the process may iteratively continue in the receiver, beginning again at block 302 with new composite channel measurements.

Figure 7:
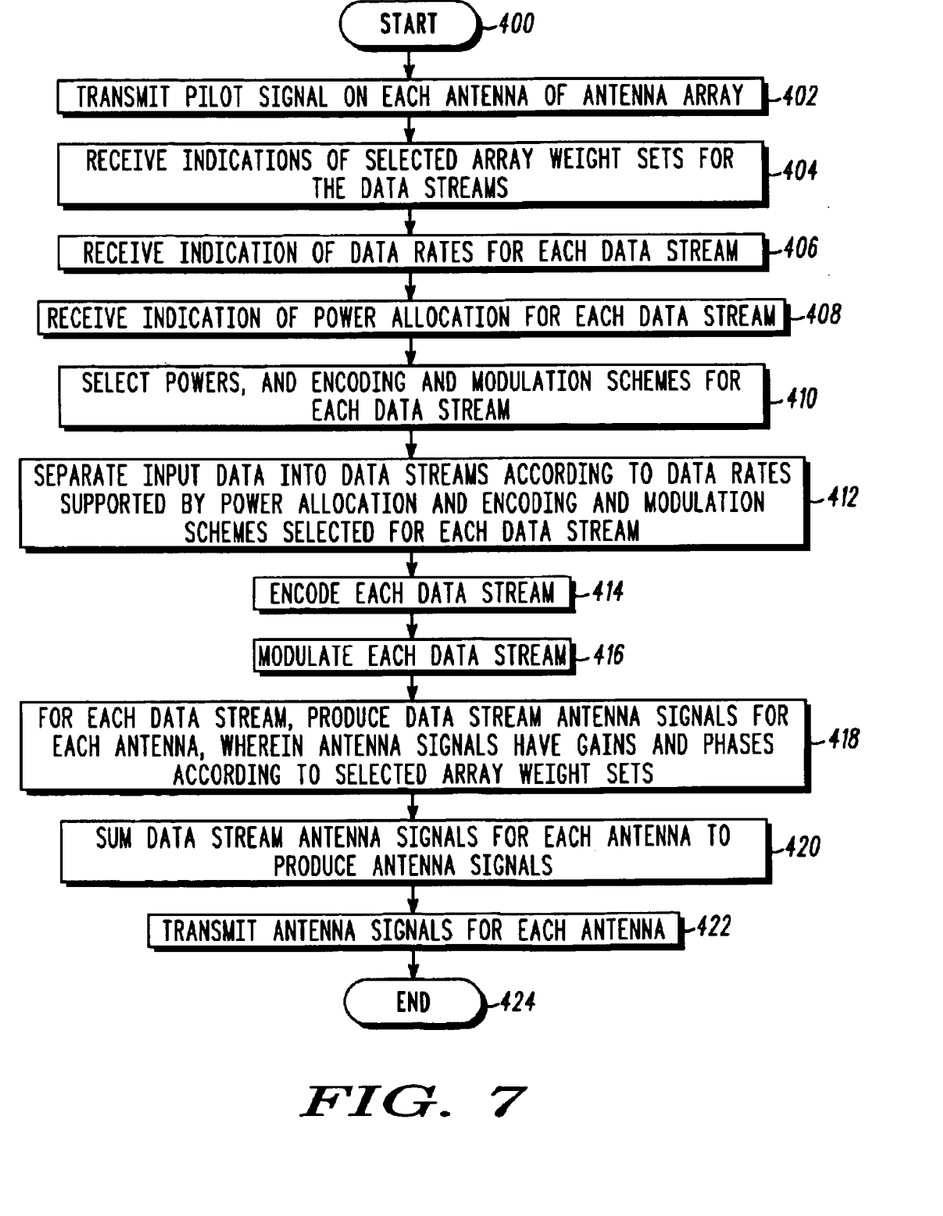
FIG. 7 is a high-level logic flow chart that illustrates a feedback method in a multiple-stream, multiple-antenna transmitter in accordance with the method and system of the present invention.

With reference now to FIG. 7, there is depicted a high-level logic flow chart that illustrates a feedback method in a multiple-stream, multiple-antenna transmitter in accordance with the method and system of the present invention. As illustrated, the process begins at block 400, and thereafter passes to block 402 wherein the process transmits a pilot signal on each antenna of the antenna array. Each pilot signal is distinguishable from the others. For example, different spreading codes may be used, or the same spreading code may be shifted in time relative to the other array antennas. These pilot signals provide a reference signal for the composite channel measurement.

Next, the process receives indications of a selected array weight set, with one set per data stream, as illustrated at block 404. The indications of selected array weight sets may be data that describe a set of gains and phases for antenna signals for each antenna, with a set for each data stream in the transmitter. In a preferred embodiment, the selected array weight sets used for each data stream may be specified through the use of a codebook value received from the receiver, wherein the codebook value is used to lookup preselected sets of array weights.

Similarly, the process receives data that indicates data rates for each data stream, as depicted at block 406. By indicating the data rate for each stream, the feedback data may also be indicating an encoding scheme, and a modulation scheme. The relationship between data rates and encoding and modulation schemes exists because different encoding and modulation schemes have different capacities. Therefore, the selection of a data rate may force the selection of particular encoding and modulation schemes.

Next, the process receives an indication of power allocation for each data stream, as illustrated at block 408. Note that a codebook value may be used as the "indicator" that indicates data rates and power allocation for each data stream. As discussed above, a single codebook value may be used to specify an encoding scheme, a modulation scheme, and a power allocation. In some embodiments, specifying a data rate alone may specify the encoder, modulator, and power allocation. For example, if the data rate selected was zero, no power is allocated and the encoding and modulation schemes are irrelevant.

After receiving the feedback data, the process selects power settings, and encoding and modulation schemes for each data stream, as depicted at block 410. In this step, these parameters may be selected according to a codebook value received. In alternative embodiments, some of these parameters may be calculated or derived from the feedback data received. For example, if the antenna pattern of the first data stream is indicated, the process in the transmitter may derive or calculate an antenna pattern used for the second data stream. This may be done when, for example, the second stream is constrained to be orthogonal to the first stream.

Once transmit parameters are selected as shown in block 410, the process separates input data into data streams according to selected data rates supported by encoding and modulation schemes selected for each data stream, as depicted at block 412. This process is implemented in data splitting function 28 shown in FIG. 3. As an example, if data stream 1 operates at twice the rate of data stream 2, then two symbols are sent to data stream 1 and a single symbol is sent to data stream 2. Similarly, if one data stream has zero power allocated, all the data symbols are sent to the remaining data streams having some power allocated.

Next, the process encodes each data stream, as illustrated at block 414. The process of encoding may be implemented with a block coder, a convolutional coder, a turbo coder, and the like.

After encoding, each data stream is modulated, as depicted at block 416. This modulation may be implemented using a BPSK modulator, a QPSK modulator, a M-PSK modulator, a M-QUAM modulator (where M is the number of constellation points), and the like.

Following the modulating step, the process modifies the gain and phase of each modulated data stream according to respective selected array weight sets to produce data stream antenna signals for each array antenna, as illustrated at block 418. Examples of data stream antenna signals are the outputs of phase shifters 82 in FIG. 4. The number of data stream antenna signals produced in this step equals the number of data streams times the number of antenna elements in the antenna array.

After producing data stream antenna signals for each array antenna, the data stream antenna signals associated with the same array antenna are summed to produce antenna signals, as depicted at block 420. Examples of antenna signals are the outputs of summers 84 in FIG. 4. These antenna signals are combinations of signals from each data stream that have been weighted in gain and phase according to the selected array weight sets. This complex combination of signals is more concisely described according to the V matrix used in the transmitter, which is discussed above in relation to FIG. 1.

Finally, the antenna signals for each antenna are transmitted, as illustrated at block 420. The transmission step includes further processing, upconversion, and amplification needed for radio frequency transmission.

The feedback method ends, as depicted at block 424. Although the process is shown with an end, the process may iteratively repeat in the transmitter in order to update each antenna pattern for each data stream in response to varying channel conditions.

Figure 8:
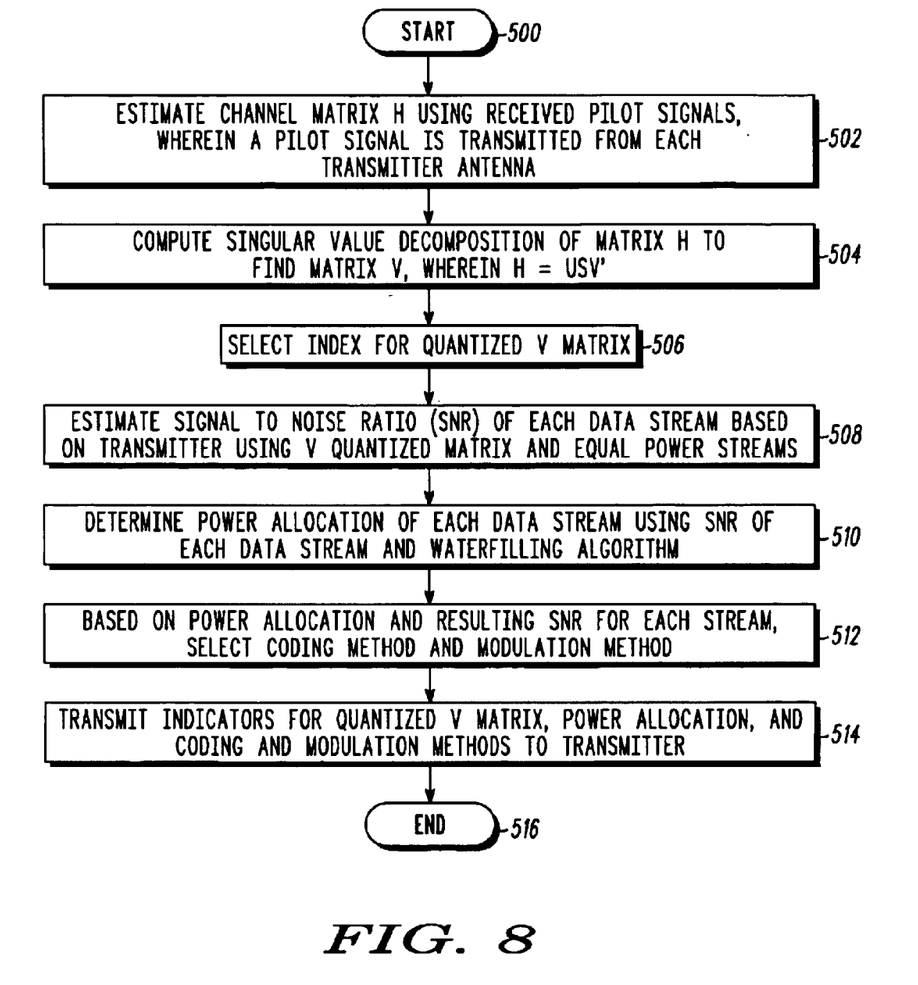
FIG. 8 is a more detailed logical flow chart that illustrates the process for estimating a composite channel and selecting array weight sets in accordance with the method and system of the present invention.

Turning now to FIG. 8, there is depicted a more detailed logical flow chart that illustrates the process for estimating a composite channel and selecting array weight sets, which is shown at a higher level in FIG. 6. As illustrated, the process begins at block 500, and thereafter passes to block 502 wherein the process estimates channel matrix H using received pilot signals, wherein a pilot signal is transmitted from each transmitter antenna. Pilots may or may not be orthogonal, but they are selected so that they are distinguishable at the receiver.

Next, the process computes a singular valve decomposition of matrix H to find matrix V, wherein $H=U S \hat{V}^T$, as depicted at block 504. Transmitting with this V matrix allows operation of the MIMO channel at near Shannon capacity for MIMO.

Thereafter, the process selects an index for a quantized V matrix, as illustrated at block 506. The quantizing may be preformed by a codebook lookup, or other methods, discussed above. Note that the quantized V matrix represents selected antenna array weight sets. Antenna array weight sets may be quantized as a group, or separately.

After quantizing, the process estimates a signal-to-noise ratio (SNR) of each data stream based on the transmitter using the quantized V matrix, and assuming equal power streams, as depicted at block 508.

Next, the process uses the estimated SNR to determine power allocation of each data stream using a waterfilling algorithm, as illustrated at block 510. An alternative to waterfilling is a brute-force search of all quantized possibilities. In a preferred embodiment, this parameter can be quantized to a low number of bits. For example, a reasonable choice for power allocation may be one-bit indicator for both streams "on", or only one stream "on" and the other "off".

Based on the power allocation for each stream, and the estimated SNR for each stream, the process next selects the coding method and modulation method, as depicted at block 512. This may be implemented with a lookup that maps every SNR range to a modulator-encoder combination. In general, the coding and modulating is adapted for each data stream according to the channel quality. For example, if high channel quality is indicated by a high SNR, the modulator may be set to 16-QAM; otherwise, QPSK modulation may be selected.

Finally, the process transmits, to the transmitter, indicators for a quantized V matrix, a power allocation for each stream, and coding and modulation methods, as illustrated at block 514. In a preferred embodiment, the process uses a codebook to indicate quantized antenna array weight sets, and other modulation parameters.

As depicted, the process ends at block 516.

Referring again to FIG. 3, the number of antennas used by transmitter 20 is equal to the number of outputs from antenna array signal processor 58. As shown in FIG. 3, antenna array signal processor 58 has two outputs, output signals 62 and 64.

As mentioned earlier, output signals 62 and 64 may be transmitted from two antennas, or multiplexer 66 may be used to select two antennas to form an antenna array from a larger number of "available antennas", such as the four antenna elements 26 shown in antenna array 24. Thus, in some embodiments of the present invention, there exists a set of available antenna elements, from which a subset of the "available antenna elements," from which a subset of the available antenna elements may be selected to form "an antenna array", wherein the antenna array comprises antenna elements actually used to transmit the multiple data streams.

While the embodiment in FIG. 3 shows multiplexer 66 for selecting antennas, alternative embodiments may use the V matrix to select antennas mathematically by multiplying signals by zero, or non-zero values according to the matrix elements.

In order to select the antenna elements from the set of available antenna elements, receiver 98 measures a composite channel that includes all channels between all pair-wise selections of all available antenna elements and all antenna elements at the receiver. Thus, in FIGS. 3 and 5, between transmitter 20 with 4 available antennas and receiver 98 with 2 receive antennas, the composite channel measurement forms a composite channel matrix H that is four rows by two columns.

At the transmitter, there are 6 ways to choose 2 antennas from a set of 4 available antennas. The antenna array is formed with the pair that yields the highest capacity composite channel. The selection process may be described by the following expression:

$$\max_i \det\left(I + \frac{1}{2\sigma^2} H_i' H_i\right) \quad (10)$$

where (without using waterfilling) half power is allocated to each data stream, $\sigma^2$ is the noise variance, I is the 2×2 identity matrix, and $$H_1 = \begin{bmatrix} h_{11} & h_{12} \\ h_{21} & h_{22} \end{bmatrix}, H_2 = \begin{bmatrix} h_{11} & h_{13} \\ h_{21} & h_{23} \end{bmatrix}, H_3 = \begin{bmatrix} h_{11} & h_{14} \\ h_{21} & h_{24} \end{bmatrix},$$

$$H_4 = \begin{bmatrix} h_{12} & h_{13} \\ h_{22} & h_{23} \end{bmatrix}, H_5 = \begin{bmatrix} h_{12} & h_{14} \\ h_{22} & h_{24} \end{bmatrix}, H_6 = \begin{bmatrix} h_{13} & h_{14} \\ h_{23} & h_{24} \end{bmatrix}.$$

To select one of the six pairs, three feedback bits are required. In order to reduce the feedback data even more, two bits can be used to select one of four pairs.

The receiver next considers all two-by-two combinations of transmit and receive antennas, wherein there are six possible combinations of two transmit antennas and two receive antennas. For each of the six combinations, an aggregate data rate is computed, wherein the aggregate data rate is the total data rate provided by adding the data rate of data stream 1 and the data rate of data stream 2. By ranking the aggregate data rates, the antenna combination that supports the highest data rate may be selected.

In an alternative embodiment of transmitter 20, antenna array signal processor 58 may use a V matrix that produces four outputs to drive four antennas in an antenna array. However, the amount of feedback data necessary to support selection of antenna array weight sets for a four-output V matrix begins to consume an unacceptable percentage of capacity of the link used for feedback data. Therefore, a two-output V matrix is used to drive two antennas that are selected from an available set of four antennas. The two antennas that are selected support the highest aggregate data rate between transmitter 20 and receiver 98. In the transmitter that selects antenna elements from a larger set of available antenna elements a trade-off has been made between reducing uplink feedback data and reducing downlink performance.

It should be appreciated from the discussion above that the present invention makes it possible to increase a data rate between a transmitter and receiver using a multiple-input multiple-output radio frequency channel. The feedback method disclosed is a practical solution to controlling a MIMO transceiver.

Advantages of using the MIMO radio frequency channel include the ability to double an effective data throughput without using additional communication resources, such as spreading codes, power, and bandwidth, and without employing higher order modulators. In other words, using the same communication resources, with the same modulator, the throughput can be doubled by effectively controlling the MIMO radio frequency channel. This effective control of the channel involves transmitting multiple data streams in a way that they can be separated from one another at the receiver. This MIMO channel control exploits specific knowledge of the channel gained by measuring a composite channel between the transmitter and receiver. Furthermore, proper control of the MIMO channel enables the use of linear receivers, rather than the more complex or expensive non-linear receiver. By transmitting the signal vector x along the channel eigenmodes (i.e., transmitting z=Vx rather than x), we can completely separate the two streams without using non-linear detectors. Thus, with the proper control of the MIMO channel, the non-linear receiver has no substantial advantage over the linear receiver.

Figure 9:
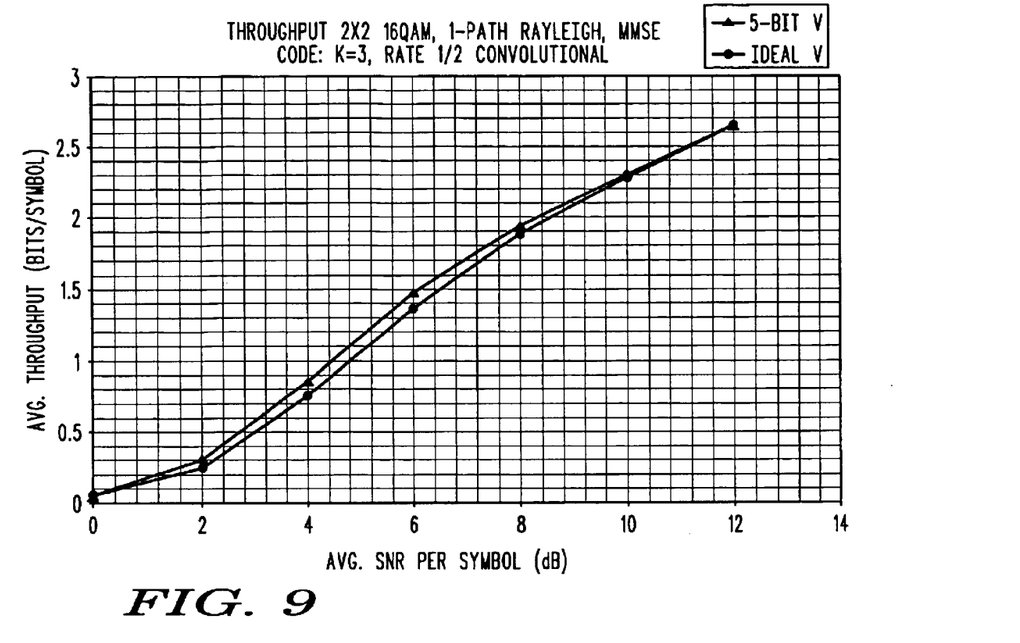
FIG. 9 shows simulation results comparing quantized MIMO feedback with un-quantized, ideal MIMO feedback, in accordance with the method and system of the present invention.

FIG. 9 shows simulation results comparing quantized MIMO feedback with un-quantized, ideal MIMO feedback. There is little degradation due to quantizing.

Figure 10:
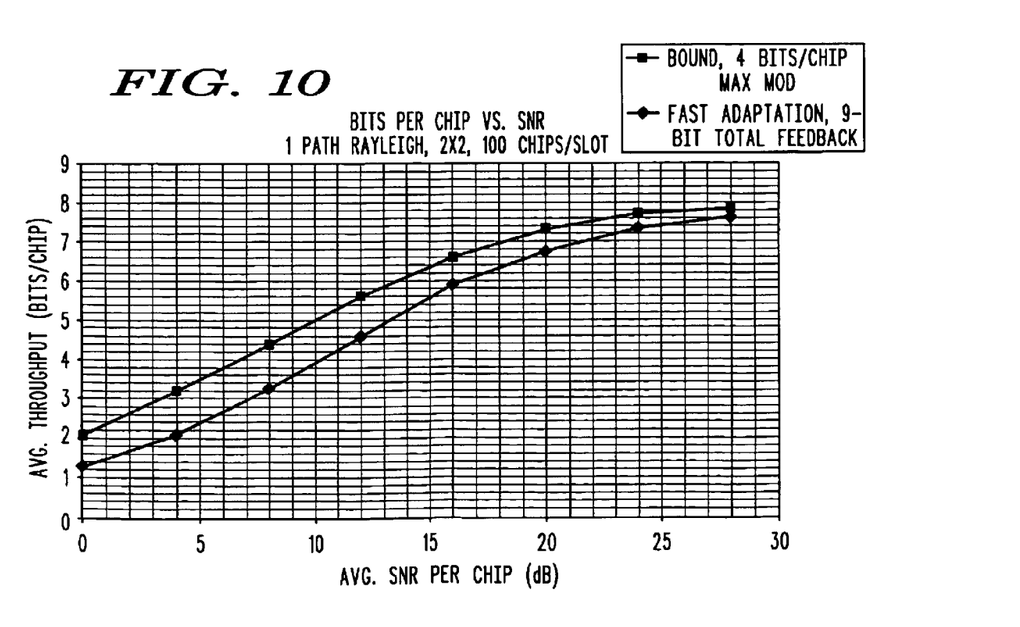
FIG. 10 shows simulation results for a MIMO transceiver system in accordance with the method and system of the present invention.

FIG. 10 shows simulation results for a MIMO transceiver system described above. The codebook used for this simulation is found in Table 1. The V matrix is selected with 5 feedback bits, and the encoding, modulation, and power allocation are selected with 4 feedback bits. The simulation results show that a MIMO system with 9 bits of feedback performs about 4 dB from the theoretical MIMO Shannon bound. Note that if some combinations of modulator, coder, and power allocation occur infrequently, they can be removed with a small loss in performance, which further reduces the feedback bits needed.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A feedback method in a multiple-stream, multiple antenna receiver, the method comprising the steps of:

measuring a composite channel between a multiple-antenna transmitter and a multiple-antenna receiver to produce a composite channel measurement;

selecting a plurality of antenna array weight sets for use in the multiple-antenna transmitter in response to the composite channel measurement, wherein each antenna array weight set is associated with one of multiple data streams; and transmitting information describing the plurality of antenna array weight sets for use in the multiple-antenna transmitter; and the step of selecting a plurality of antenna array weight sets further includes selecting a plurality of antenna array weight sets having a cross correlation less than an inverse of a number of antenna elements in the antenna array of the multiple-antenna transmitter.

2. The feedback method of claim 1 further including the steps of:

selecting a data rate for each data stream in response to the composite channel measurement; and transmitting information describing the data rate selection for use in the multiple-antenna transmitter.

3. The feedback method of claim 1 further including the steps of transmitting information used to describe a quality of each data stream for use in the multi-antenna transmitter.

4. The feedback method of claim 1 wherein the step of transmitting information describing the plurality of antenna array weight sets further includes transmitting a first amount of information describing a first antenna array weight set and transmitting a second amount of information describing a second antenna array weight set, wherein the second amount of information is less than the first amount of information.

5. The feedback method of claim 1 wherein the step of selecting the plurality of antenna array weight sets further includes the steps of:

selecting a first antenna array weight set from a codebook having a plurality of preselected antenna array weight sets; and selecting a second antenna array weight set from a subset of the codebook.

6. The feedback method of claim 5 wherein the step of transmitting information describing the plurality of antenna array weight sets further includes the steps of:

transmitting a first amount of information describing a first antenna array weight set; and transmitting a second amount of information describing a second antenna array weight set, wherein the second amount of information is less than the first amount of information.

7. The feedback method of claim 6 wherein the steps of transmitting a first amount of information describing a first antenna array weight set and transmitting a second amount of information describing a second antenna array weight set further includes jointly encoding the first and second amount of information.

8. The feedback method of claim 1 further including the step of transmitting information needed to set data rates of each data stream in the multiple-antenna transmitter.

9. The feedback method of claim 1 further including the step of transmitting information needed to set a relative transmit power of each data stream in the multiple-antenna transmitter.

10. The feedback method of claim 1 further including the steps of;

measuring a composite channel between a multiple-antenna transmitter and a multiple-antenna receiver to produce a composite channel measurement, wherein pilot signals are received from M number of available antennas at the multiple-antenna transmitter;

selecting N antennas to be used at the transmitter, from M number of available antennas, in response to the composite channel measurement, wherein the N selected antennas will be used to form the antenna array at the multiple-antenna transmitter.

11. A feedback method in a multiple-stream, multiple-antenna transmitter, the method comprising the steps of:

receiving indications of a selected data rate for each data stream;

splitting user data in proportion to the selected data rates for each data stream to produce multiple data streams;

transmitting a pilot signal from each antenna of an antenna array;

receiving indications of a selected antenna array weight set for each of the multiple data streams, wherein each antenna array weight set includes weights associated with each antenna of the antenna array;

using the selected antenna array weight sets, weighting each data stream to produce antenna signals for each antenna in the antenna array; and transmitting multiple data streams using the selected data rates for each data stream.

12. The feedback method of claim 11 further including the steps of:

encoding and modulating each of the multiple data streams to produce modulated data streams; and using the selected antenna array weight sets, weighting each modulated data stream to produce antenna signals for each antenna in the antenna array.

13. The feedback method of claim 12 further including the steps of:

selecting encoding and modulation schemes for each data stream in response to the selected data rate; and transmitting multiple data streams using the selected encoding and modulation schemes for each data stream.

14. A feedback method in a multiple-stream, multiple-antenna transceiver having a multiple-antenna transmitter and a multiple-antenna receiver, the method comprising the steps of:

splitting user data to produce multiple data streams;

in the multiple-antenna transmitter, transmitting a pilot signal from each antenna of an antenna array;

using the pilot signals from each antenna of the antenna array, measuring a composite channel between the multiple-antenna transmitter and the multiple-antenna receiver to produce a composite channel measurement;

selecting a plurality of antenna array weight sets for use in the multiple-antenna transmitter in response to the composite channel measurement, wherein each antenna array weight set is associated with one of multiple data streams and wherein each of the plurality of antenna weight sets has a cross correlation less than an inverse of a number of antenna elements in the antenna array;

transmitting, from the multiple-antenna receiver to the multiple-antenna transmitter, information describing the plurality of antenna array weight sets;

in the multiple-antenna transmitter, receiving information describing a selected antenna array weight set for each of the multiple data streams, wherein each antenna array weight set includes weights associated with each antenna of the antenna array;

encoding and modulating each of the multiple data streams to produce modulated data streams;

using the selected antenna array weight sets, weighting each modulated data stream to produce antenna signals for each antenna in the antenna array; and transmitting multiple data streams using the selected antenna array weight set for each data stream, wherein each data stream has a different antenna pattern.

* * * * *